(12) United States Patent
De Vries

(10) Patent No.: US 7,442,228 B2
(45) Date of Patent: Oct. 28, 2008

(54) METHOD AND DEVICE FOR CONTROLLING THE PROPORTION OF CRYSTALS IN A LIQUID-CRYSTAL MIXTURE

(75) Inventor: Paul Alexander De Vries, Heemstede (NL)

(73) Assignee: Aleris Switzerland GmbH c/o K+P Treuhangesellschaft, Schaffhausen (CH)

( * ) Notice: Subject to any disclaimer, the term of this patent is extended or adjusted under 35 U.S.C. 154(b) by 442 days.

(21) Appl. No.: 10/491,278

(22) PCT Filed: Oct. 2, 2002

(86) PCT No.: PCT/EP02/11190

§ 371 (c)(1), (2), (4) Date: Sep. 29, 2004

(87) PCT Pub. No.: WO03/031663

PCT Pub. Date: Apr. 17, 2003

(65) Prior Publication Data

US 2005/0039578 A1     Feb. 24, 2005

(30) Foreign Application Priority Data

Oct. 3, 2001    (NL)  ............................ 1019105

(51) Int. Cl.
     *C22B 21/00*      (2006.01)
(52) U.S. Cl. .......................... 75/386; 148/549
(58) Field of Classification Search ............. 75/386
     See application file for complete search history.

(56) References Cited

U.S. PATENT DOCUMENTS

| | | | |
|---|---|---|---|
| 1,562,090 A | 11/1925 | Hoopes | |
| 1,938,101 A | 12/1933 | Hall | |
| 3,211,547 A | 10/1965 | Jarrett et al. | |
| 3,296,811 A * | 1/1967 | Stoller | .................. 62/540 |
| 3,303,019 A | 2/1967 | Jacobs | |
| 3,308,666 A * | 3/1967 | Anderson et al. | ............. 338/28 |
| 3,671,229 A | 6/1972 | Ferber et al. | |

(Continued)

FOREIGN PATENT DOCUMENTS

DE      258283      7/1988

(Continued)

OTHER PUBLICATIONS

G.S.Hanumanth etal: "Particle sedimentation during processing of liquid metal-matrix composites" Metallurgical transaction B, vol. 23B, pp. 753-763, 1992.*

(Continued)

*Primary Examiner*—Roy King
*Assistant Examiner*—Jie Yang
(74) *Attorney, Agent, or Firm*—Novak Druce & Quigg LLP

(57) ABSTRACT

The invention relates to a method for controlling the proportion of aluminum crystals in a mixture of molten aluminum alloy and aluminum crystals. The electrical resistance of the mixture is determined with the aid of a four-point measurement. With the aid of the measured electrical resistance, the proportion of crystals in the mixture can be kept constant within narrow margins. The invention also relates to a device for carrying out the method.

14 Claims, 1 Drawing Sheet

U.S. PATENT DOCUMENTS

Figure 1:
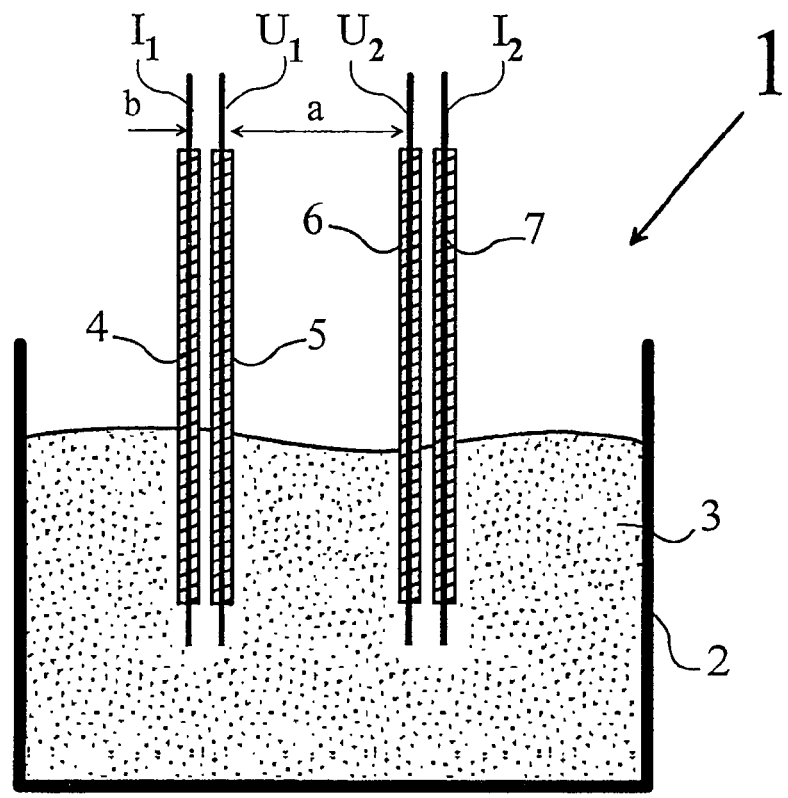

| | | | |
|---|---|---|---|
| 3,839,019 A | 10/1974 | Bruno et al. | |
| 3,840,219 A | 10/1974 | Sheridan et al. | |
| 3,840,364 A | 10/1974 | Flemings et al. | |
| 4,043,802 A * | 8/1977 | Esdaile et al. | 75/663 |
| 4,050,683 A | 9/1977 | Langhammer | |
| 4,099,965 A | 7/1978 | Beguin et al. | |
| 4,133,517 A | 1/1979 | Esdaile et al. | |
| 4,222,830 A | 9/1980 | Dawless et al. | |
| 4,239,606 A | 12/1980 | Dawless et al. | |
| 4,243,211 A | 1/1981 | Leroy et al. | |
| 4,273,627 A | 6/1981 | Dawless et al. | |
| 4,305,763 A | 12/1981 | Quist et al. | |
| 4,411,747 A | 10/1983 | Dawless et al. | |
| 4,456,480 A | 6/1984 | Wintenberger | |
| 4,581,062 A | 4/1986 | Boutin | |
| 4,736,314 A | 4/1988 | Riese et al. | |
| 4,744,823 A | 5/1988 | Raymond-Seraille | |
| 4,781,771 A | 11/1988 | Masumoto et al. | |
| 5,160,532 A | 11/1992 | Benz et al. | |
| 5,221,377 A | 6/1993 | Hunt, Jr. et al. | |
| 5,312,498 A | 5/1994 | Anderson | |
| 5,741,348 A | 4/1998 | Van Der Donk et al. | |
| 5,968,223 A | 10/1999 | Eckert | |
| 6,143,070 A | 11/2000 | Bliss et al. | |
| 6,224,648 B1 | 5/2001 | Verdoes et al. | |
| 6,290,900 B1 | 9/2001 | Hatano et al. | |
| 6,355,085 B1 | 3/2002 | Pilin et al. | |
| 6,909,505 B2 | 6/2005 | Lucas et al. | |
| 2001/0031823 A1 * | 10/2001 | Atchetee et al. | 524/496 |
| 2004/0261572 A1 | 12/2004 | De Vries | |
| 2005/0145071 A1 | 7/2005 | Cates | |
| 2005/0178239 A1 | 8/2005 | De Vries et al. | |
| 2006/0162491 A1 | 7/2006 | De Vries et al. | |
| 2007/0023110 A1 | 2/2007 | De Vries | |
| 2007/0272057 A1 | 11/2007 | De Vries et al. | |

FOREIGN PATENT DOCUMENTS

| | | |
|---|---|---|
| DE | 0258283 | 7/1988 |
| DE | 4325793 | 2/1995 |
| EP | 0099948 | 2/1984 |
| EP | 0375308 | 6/1990 |
| EP | 0587274 | 3/1994 |
| EP | 0745693 | 12/1996 |
| EP | 0829552 | 3/1998 |
| EP | 1288319 | 3/2003 |
| EP | 1380659 | 1/2004 |
| FR | 1594154 | 6/1970 |
| GB | 0615590 | 1/1949 |
| GB | 885503 | 12/1961 |
| GB | 974829 | 11/1964 |
| GB | 1352567 | 5/1974 |
| GB | 2154315 | 9/1985 |
| JP | 52135797 | 11/1977 |
| JP | 55050442 | 4/1980 |
| JP | 57152435 | 9/1982 |
| JP | 59205424 | 5/1983 |
| JP | 58104132 | 6/1983 |
| JP | 59028538 | 2/1984 |
| JP | 60234930 | 11/1985 |
| JP | 7070666 | 3/1995 |
| RU | 2105084 | 2/1998 |
| SU | 1589173 | 8/1990 |
| WO | 02052053 | 7/2002 |
| WO | 2005095658 | 10/2005 |

OTHER PUBLICATIONS

L.C.Bartel et al: "An Electrical Resistivity Measurement in Molten Basalt During the 1983 Kilauea Eruption" Bull. Volcanol., vol. 46.3, pp. 271-276, 1983.*

Perry's Chemical Engineers' Handbook, 7th ed., McGraw-Hill, 1997, pp. 18-5 to 18-13.

Fourth Int'l Symposium on Recycling of Metals and Engineered Materials TMS (The Minerals, Metals, and Materials Society) 2000, pp. 979-991, Refining of a 5xxx Series Aluminium Alloy Scrap by ALCOA Fractional Crystallization, by Ali Unal.

Unpublished U.S. Appl. No. 10/598,731, filed Sep. 8, 2006, De Vries.

Jo Isenberg-O'Loughlin, "Taming the Thunder," Metal Producing, vol. 33, pp. 21-23 (Sep. 1994).

Patent Abstracts of Japan, vol. 002, No. 019 (E-011)(Feb. 8, 1978).

Paper No. XP002204564, Database WPI, Section Ch, Week 199119, Derwent Publications Ltd., London, GB, AN 1991-138522 (Nov. 2, 1988).

Translation of JP 55-050442, published Apr. 1980.

Translation of JP 60-234930, published Nov. 1985.

* cited by examiner

METHOD AND DEVICE FOR CONTROLLING THE PROPORTION OF CRYSTALS IN A LIQUID-CRYSTAL MIXTURE

The invention relates to a method for controlling the proportion of aluminum crystals in a mixture of molten aluminum alloy and aluminum crystals.

A mixture of molten aluminum alloy and aluminum crystals is present, for example, in the fractional crystallization of contaminated aluminum. Fractional crystallization is a known method for purifying a contaminated metal alloy and is described, inter alia, in U.S. Pat. No. 3,840,364. One of the forms of fractional crystallization is suspension crystallization. In suspension crystallization, the contaminated metal alloy is cooled slowly from the melt. As solidification begins, very pure metal crystallizes out, and as cooling continues metal which is progressively less pure crystallizes out. By separating the crystals from the uncrystallized liquid in the mixture, metal crystals consisting of an alloy with a significantly higher purity than the original metal alloy are obtained. In addition, suspension crystallization can also be used for a more highly contaminated metal, in which case the impure metal crystallizes out first.

One problem with carrying out this method is that the proportion of crystals in the mixture is difficult to control. However, this is necessary in order to allow industrial application of the method. In the case of suspension crystallization, measurement of the temperature of the mixture cannot be used or can scarcely be used to control the proportion of crystals. On the one hand, the temperature which has to be measured is high, approximately 700° C. for aluminum, making the temperature difficult to measure with accuracy, and on the other hand pure aluminum will crystallize at one fixed temperature and therefore, at this temperature, may be either completely liquid or completely crystallized, as well as every possible state in between. Therefore, temperature measurement cannot be used to control the proportion of crystals in the mixture; in the event of excessive cooling, the mixture may solidify completely, without this being controllable with the aid of the temperature measurement. If the aluminum is slightly contaminated, there is a temperature difference between the completely liquid state and the completely crystallized state, but this temperature difference is very small and depends on the impurities present, which are not usually known with accuracy. Therefore, measurement of the temperature cannot be used in the industrial suspension crystallization of contaminated aluminum to keep the proportion of crystals in the mixture constant within a reasonable margin.

It is an object of the invention to provide a method with which the proportion of aluminum crystals in a mixture of molten aluminum alloy and aluminum crystals can be controlled during, for example, fractional crystallization.

Another object of the invention is to provide a method of this type, which can be used accurately and on an industrial scale.

Yet another object of the invention is to provide a method of this type, which is simple and reliable.

In addition, it is an object of the invention to provide a device with which the method can be carried out.

One or more of these objects are achieved with a method for controlling the proportion of aluminum crystals in a mixture of molten aluminum alloy and aluminum crystals in which the electrical resistance of the mixture is determined with the aid of a four-point measurement.

The electrical resistance measurement makes it possible to accurately control the proportion of crystals in the melt, even if the percentage of crystals is not known, since the crystals have a significantly lower resistance than the melt (factor of 2.2). With this method according to the invention, it is possible to keep the proportion of crystals in the melt constant with sufficient accuracy for industrial application without it being known precisely which impurities are present and without any knowledge of phase diagrams.

However, the resistance in molten aluminum is low and has to be measured very accurately. Therefore, the resistance is measured with the aid of a four-point measurement in which a current is passed through the mixture between two points and the voltage in the voltage field between the two current-carrying point is measured between two separate voltage-measuring points. The two voltage-measuring points generate a negligible current, so that measurement of contact resistance is avoided. The current intensity which has to be used between the current-carrying points is at least 5 amperes in order to allow a voltage of a few tenths of a millivolt to be measured over a path of 40 mm.

The four-point measurement can be carried out completely independently of any temperature measurement.

The mixture is preferably stirred continuously, in order to keep a constant ratio between crystals and melt throughout the mixture and in order to counteract as far as possible the growth of crystals on the walls of the mixing vessel in which the measurement is carried out.

The method is preferably carried out during the fractional crystallization of contaminated aluminum. Accurate control of the proportion of crystals in the mixture is very important in the fractional crystallization of contaminated aluminum.

The method according to the invention can be carried out in the batchwise fractional crystallization of aluminum in order to separate the mixture as soon as a defined percentage of crystals is obtained.

However, the method is preferably used if the crystallization is carried out as continuous crystallization. In the case of continuous fractional crystallization, molten contaminated aluminum is supplied continuously, and a mixture of crystals and molten aluminum alloy is discharged continuously. For this purpose, the mixture has to be cooled to a greater or lesser extent, inter alia as a function of the temperature of the contaminated aluminum supplied. The cooling of the mixture then has to be controlled by the four-point measurement.

The electrical resistance is preferably kept constant in continuous crystallization. The proportion of crystals in the mixture discharged is then also constant and can be set to an optimum value. To keep the resistance constant, by way of example the cooling and/or supply and discharge of the aluminum can be regulated.

The proportion of aluminum crystals is preferably kept constant within a margin of plus or minus 4%, more preferably within a margin of plus or minus 2%. A margin of this nature means that in a subsequent process the mixture can easily be separated into crystals and molten aluminum.

The method is preferably used on aluminum in which the contamination consists at least in part of Fe. Particularly in the case of AlFe, the eutectic melting point is just below the melting point of pure aluminum, so that accurate control of the process and therefore accurate measurement are required.

The invention also relates to a device for controlling the proportion of aluminum crystals with the aid of the method as described above, comprising a vessel for holding the mixture, a means for regulating the temperature of the contents of the vessel, and a four-point ohmmeter with two electrodes for current to pass through and having two electrodes for measuring voltage, which electrodes are preferably surrounded by a protective tube.

The method according to the invention is therefore carried out using a known vessel with temperature control, in which a four-point measurement is carried out using a four-point ohmmeter configuration which is known per se and in which, however, the current-carrying electrodes are preferably at least partially surrounded by a protective tube. Using the protective tube protects the metal electrode from being dissolved in the melt and also leads to the current being fed into and out of the melt at the correct locations.

The protective tubes preferably consist of ceramic material, more preferably $Al_2O_3$. Ceramic material is able to withstand molten aluminum, and $Al_2O_3$ is a readily available and relatively inexpensive material.

According to an advantageous embodiment, the current-carrying and voltage-measuring electrodes in the protective tubes contain molten aluminum during use. The use of molten electrodes means that there will be no oxide layer between the electrodes and the melt, so that the contact resistance is low.

According to an advantageous embodiment, the current-carrying electrodes are positioned at a distance from the walls of the vessel, which is at least equal to half the distance between the current-carrying electrodes. As a result, in the event of any growth of crystals on the inner wall of the vessel, the current will nevertheless pass almost completely through the mixture between the current-carrying electrodes, and will not pass or will scarcely pass through the crystals on the vessel wall.

It is preferable for each of the voltage-measuring electrodes to be positioned at a distance of at least 5 mm from the associated current-carrying electrode. Any growth of crystals on the current-carrying electrodes then has little or no effect on the voltage measurement via the voltage-measuring electrodes.

The invention will be explained on the basis of an exemplary embodiment and with reference to the appended drawing, in which:

FIG. 1 provides a highly diagrammatic illustration of an exemplary embodiment of the device according to the invention.

Figure 2:
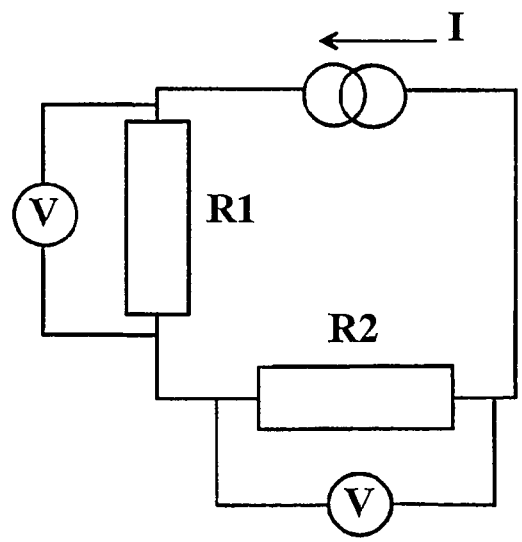

FIG. 2 provides a highly diagrammatic illustration of the current circuit of the four-point measurement according to the invention.

FIG. 1 provides a highly diagrammatic illustration of an embodiment of a device 1 for controlling the percentage of crystals in a mixture of a molten aluminum alloy and aluminum crystals during the fractional crystallization of contaminated aluminum. The device 1 comprises a vessel 2 for holding the mixture 3, protective tubes 4, 5, 6 and 7 for electrodes for carrying out a four-point measurement, and equipment for regulating the temperature of the mixture (not shown) and stirring equipment (not shown). Obviously, an inlet and outlet for the mixture, insulation materials and the like may be fitted to the vessel, as is known to a person skilled in this field.

The protective tubes 4, 5, 6 and 7 consist of ceramic material and each have a current-carrying electrode, $I_1$ and $I_2$, or a voltage-measuring electrode, $U_1$ and $U_2$. The current-carrying and voltage-measuring electrodes are illustrated in FIG. 1 as solid electrodes made from aluminum wire with a diameter of 2 mm, which project beyond the ceramic material.

During use, the current will flow from current-carrying electrode $I_1$ to current carrying electrode $I_2$. The voltage-measuring electrodes $U_1$ and $U_2$ are positioned between the current-carrying electrodes $I_1$ and $I_2$, since that is where the voltage difference is greatest. To ensure that the current will not or will scarcely flow via (crystals on) the wall of the vessel, the electrodes must be positioned at a distance from the walls of the vessel, which is at least half the distance between the current-carrying electrodes. The distance a between the voltage-measuring electrodes is, for example, approximately 50 mm. The distance b between the current-carrying electrode and the associated voltage-measuring electrode is, for example, 5 mm.

The possibility of the electrodes being partially melted is not shown. In that case, the electrode which in the solid state projects out of the protective tube will be at least partially melted at its end and will form a hollow meniscus in the corresponding protective tube. Since the electrode is (partially) melted at its end, the contact resistance between the mixture 3 and the electrodes will be very low, and consequently the four-point measurement will have a greater accuracy.

FIG. 2 provides a highly diagrammatic illustration of how the four-point measurement is carried out. A current I from a current source is successively passed through a reference resistance R1 and through the melt. The melt is obviously also a resistance, denoted by R2. The voltage is measured across the two resistances R1 and R2. The current I has to be measured constantly with a very high level of accuracy. The resistance R2 can then be determined on the basis of the measured values for the voltage across R1 and R2 and the known value for the reference resistance R1.

Obviously, calculation and control equipment will have to be present in order to measure and process the current and voltages and, on the basis of this information, to control the temperature-regulating equipment.

The method according to the invention will now be described with reference to FIG. 1.

A slightly contaminated aluminum is introduced into the vessel 2 and heated until it has completely melted. The protective tubes 4, 5, 6 and 7 with the current-carrying electrodes $I_1$ and $I_2$ and the voltage-measuring electrodes $U_1$ and $U_2$ are placed into the molten aluminum. It is preferable to wait until the ends of the electrodes have (partly) melted. Then, a current with an intensity of, for example, 10A is passed through the melt, in accordance with the arrangement shown in FIG. 2. Then the melt is slowly cooled with the aid of the temperature-regulating equipment. At a given moment, crystals will precipitate in the melt, which crystals will be distributed as uniformly as possible through the melt by the stirring equipment. The crystals have a composition, which is purer than the melt. Since the crystals have a lower resistance than the melt, the resistance of the mixture will drop. In theory, the percentage of crystals present in the melt can be determined on the basis of the voltage between the voltage-measuring electrodes $U_1$ and $U_2$, which is measured by means of the four-point measurement, and a known composition of the contaminated aluminum. In practice, it will be necessary to determine, on the basis of experiments for a defined arrangement of specific electrodes, what percentage of crystals is present at what voltage.

The above text provides a description of a batch process. In practice, the method will preferably be carried out as a continuous process, in which completely melted contaminated aluminum is supplied continuously and a mixture of (more intensively contaminated) molten aluminum and crystals is discharged continuously. In this case, it is important, above all, to keep the resistance in the mixture constant by means of cooling or heating, so that the percentage of crystals which is discharged is constant. The percentage of crystals which is obtained can be adjusted slowly in a continuous process.

The invention claimed is:

1. A method comprises controlling the proportion of aluminum crystals in a mixture of molten aluminum alloy and aluminum crystals, by determining at least the electrical resistance of the mixture with the aid of a four-point measurement.

2. The method as claimed in claim 1, in which the mixture is stirred continuously.

3. The method as claimed in claim 1, which is carried out during fractional crystallization of contaminated aluminum.

4. The method as claimed in claim 3, in which the crystallization is carried out as continuous crystallization.

5. The method as claimed in claim 4, in which the electrical resistance is kept substantially constant.

6. The method as claimed in claim 1, in which the contamination comprises at least in part Fe.

7. A method controlling the proportion of aluminum crystal in a mixture of molten aluminum alloy and aluminum crystals, comprising:
　　introducing the mixture into a vessel;
　　regulating the temperature of the contents of the vessel;
　　passing a current through the mixture with two electrodes of a four-point ohmmeter;
　　measuring a voltage with two electrodes of the four-point ohmmeter to control the proportion of aluminum crystal in a mixture of molten aluminum alloy and aluminum crystals.

8. The method as claimed in claim 7, in which the electrodes are each surrounded by a protective tube and the protective tubes consist of ceramic material.

9. The method as claimed in claim 7, in which the current-carrying and voltage-measuring electrodes in the protective tubes contain molten aluminum during use.

10. The method as claimed in claim 7, in which the current-carrying electrodes are positioned at a distance from the walls of the vessel, which is at least equal to half the distance between the current-carrying electrodes.

11. The method as claimed in claim 7, in which each of the voltage-measuring electrodes is positioned at a distance of at least 5 mm from the associated current-carrying electrode.

12. The method as claimed in claim 7, in which the electrodes are surrounded by a protective tube.

13. The method as claimed in claim 7, in which the electrodes are each surrounded by a protective tube and the protective tubes consist of $Al_2O^3$.

14. The method as claimed in claim 7, wherein prior to passing the current through the mixture, an end portion of each electrode is partially melted in the mixture.

* * * * *